US012695992B2

(12) United States Patent
Toyoda

(10) Patent No.: US 12,695,992 B2
(45) Date of Patent: Jul. 28, 2026

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Takuya Toyoda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 196 days.

(21) Appl. No.: 18/776,569

(22) Filed: Jul. 18, 2024

(65) Prior Publication Data

US 2025/0039548 A1     Jan. 30, 2025

(30) Foreign Application Priority Data

Jul. 28, 2023     (JP) ................................. 2023-123766

(51) Int. Cl.
  *H04N 23/69*     (2023.01)
  *H04N 23/611*     (2023.01)
  *H04N 23/695*     (2023.01)
(52) U.S. Cl.
  CPC ......... *H04N 23/695* (2023.01); *H04N 23/611* (2023.01)
(58) Field of Classification Search
  CPC ........................... H04N 23/695; H04N 23/611
  See application file for complete search history.

(56) References Cited

U.S. PATENT DOCUMENTS 5,471,296 A  *  11/1995  Parker .................. H04N 23/695
                                        356/141.2
5,517,300 A  *  5/1996  Parker .................... B25J 9/1697
                                        348/169
5,801,770 A  *  9/1998  Paff ..................... G08B 13/1963
                                        348/E7.086

(Continued)

FOREIGN PATENT DOCUMENTS

JP        2005020399 A      1/2005
JP        2015220723 A      12/2015

OTHER PUBLICATIONS

The above patent documents were cited in a European Search Report issued on Jun. 12, 2024, that issued in the corresponding European Patent Application No. 24188790.0.

*Primary Examiner* — Howard D Brown, Jr.
(74) *Attorney, Agent, or Firm* — Cowan, Liebowitz & Latman, P.C.

(57) ABSTRACT

An information processing apparatus configured to control an image capturing apparatus including a driving unit for driving in a pan or a tilt direction, comprises a unit configured to update a threshold value in a direction opposite to a change direction within a range when a driving speed of the driving unit is changed across the threshold value within the range, and a unit configured to change the driving speed to a value equal to or greater than an upper limit value of the range when a speed of a tracking target of the image capturing apparatus is equal to or greater than the threshold value within the range, and change the driving speed to a value equal to or less than a lower limit value of the range when the speed of the tracking target is less than the threshold value within the range.

17 Claims, 13 Drawing Sheets

(56) References Cited

U.S. PATENT DOCUMENTS

| | | | |
|---|---|---|---|
| 2004/0263681 A1 | 12/2004 | Teramoto | |
| 2009/0026996 A1* | 1/2009 | Nakane | H02P 8/22 |
| | | | 318/696 |
| 2011/0181687 A1* | 7/2011 | Yoshizumi | H04N 23/698 |
| | | | 348/36 |
| 2012/0120249 A1* | 5/2012 | Yoshizumi | H04N 23/64 |
| | | | 348/169 |
| 2017/0155828 A1* | 6/2017 | Irie | H04N 23/63 |
| 2021/0297594 A1* | 9/2021 | Usami | H04N 23/695 |
| 2023/0269479 A1* | 8/2023 | Wakamatsu | G06T 7/20 |
| | | | 348/207.99 |
| 2023/0393367 A1* | 12/2023 | Uchida | G02B 7/04 |
| 2025/0039548 A1* | 1/2025 | Toyoda | H04N 23/611 |
| 2025/0159350 A1* | 5/2025 | Konno | H04N 23/66 |

* cited by examiner

F I G.  1
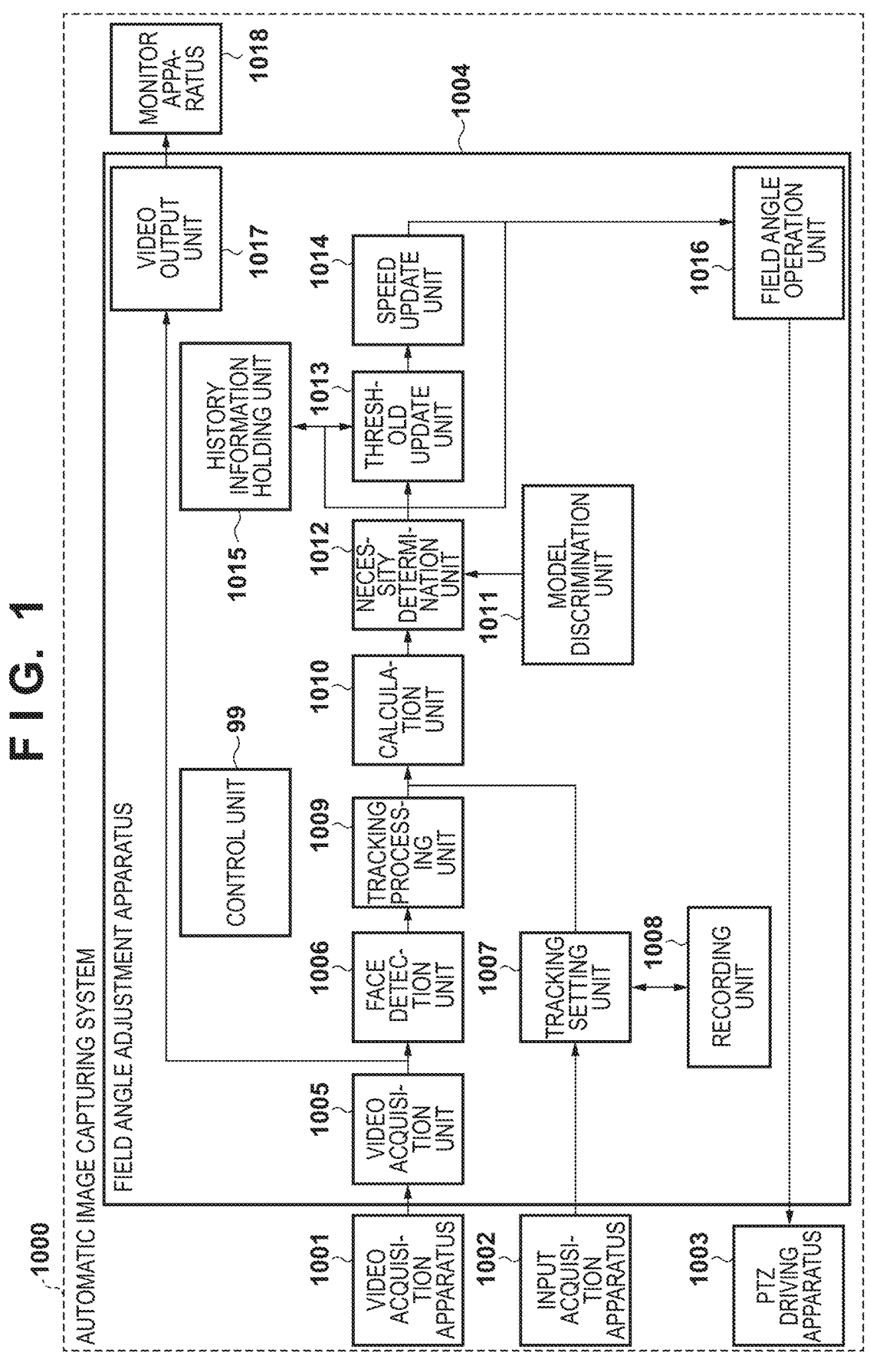

F I G. 2B
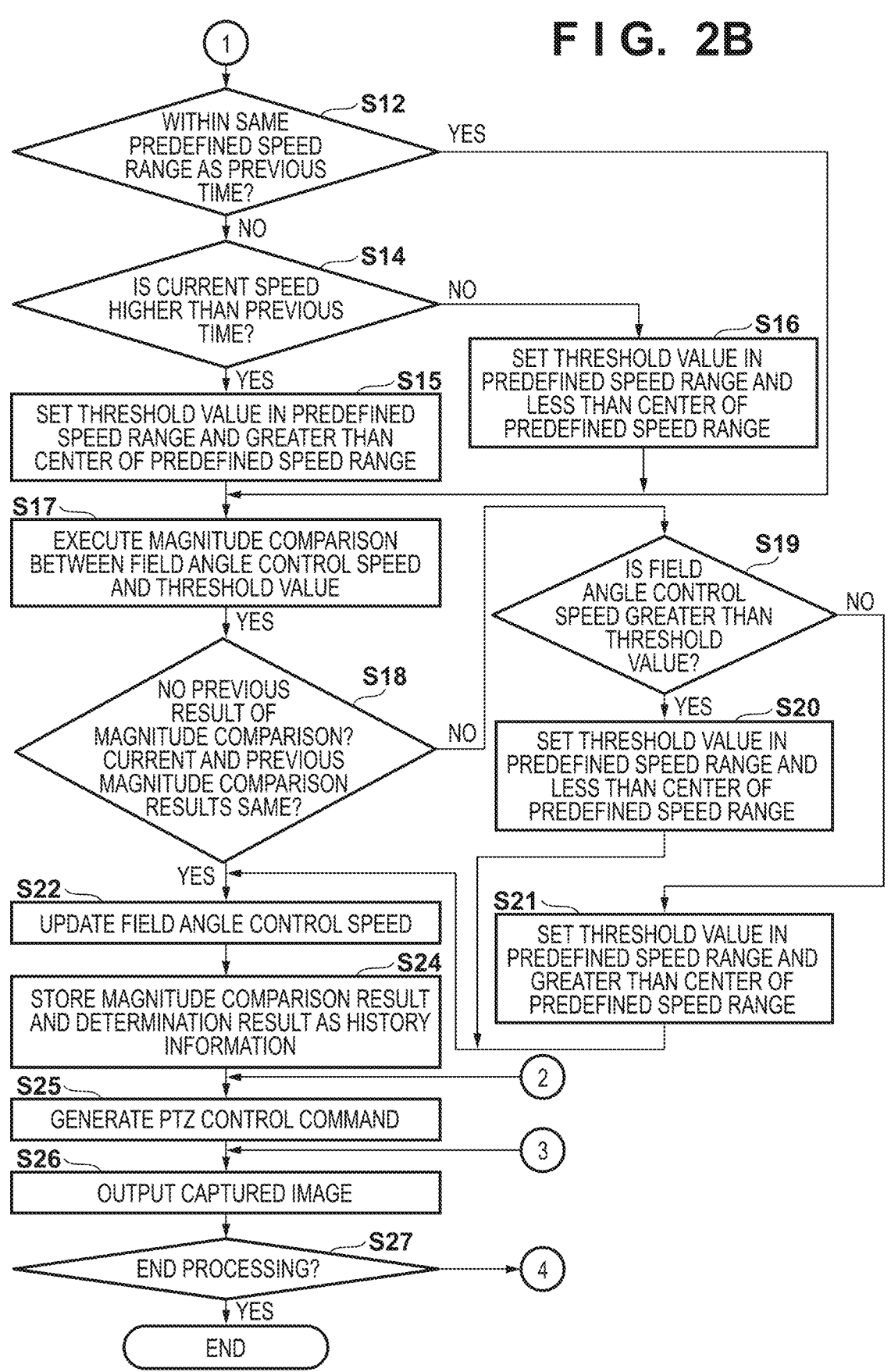

F I G. 3A
D001
P001
+
P002
F I G. 3B
D002
P003
+
P004
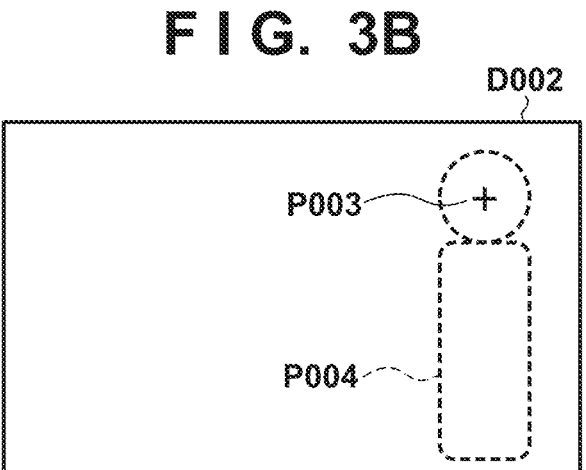

SPEED [deg/s]

SPEED [deg/s]

SPEED [deg/s]

SPEED [deg/s]

F I G. 5A
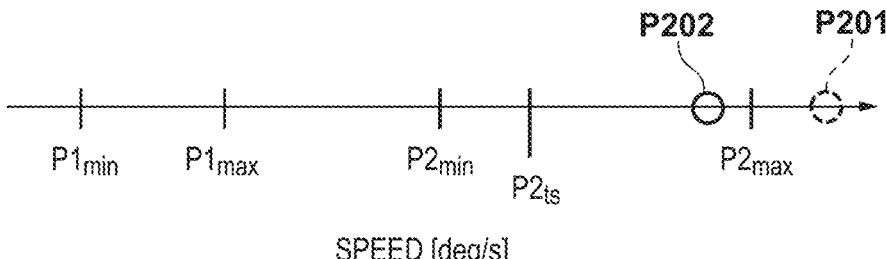
F I G. 5B
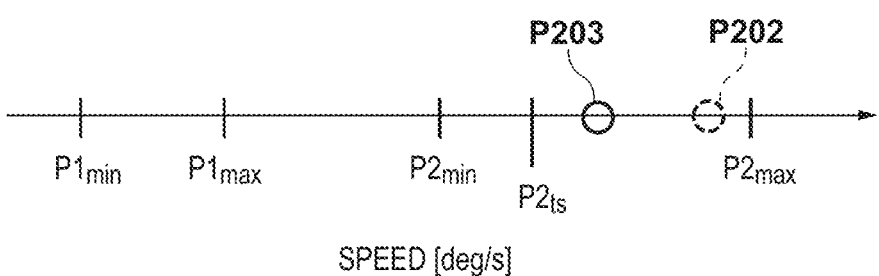
F I G. 5C
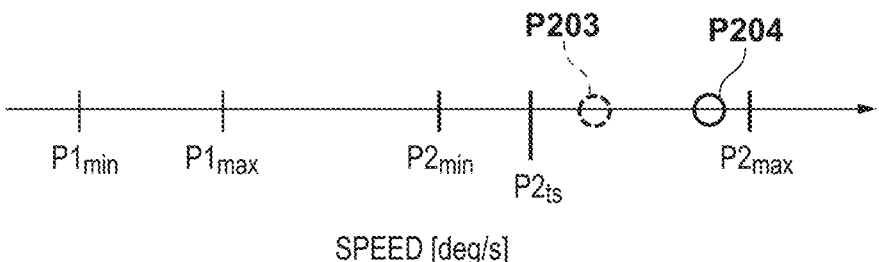
F I G. 5D
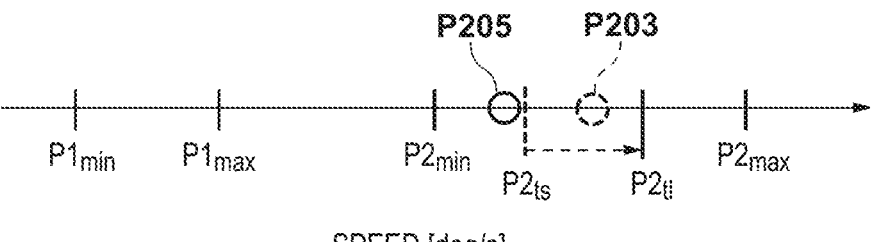

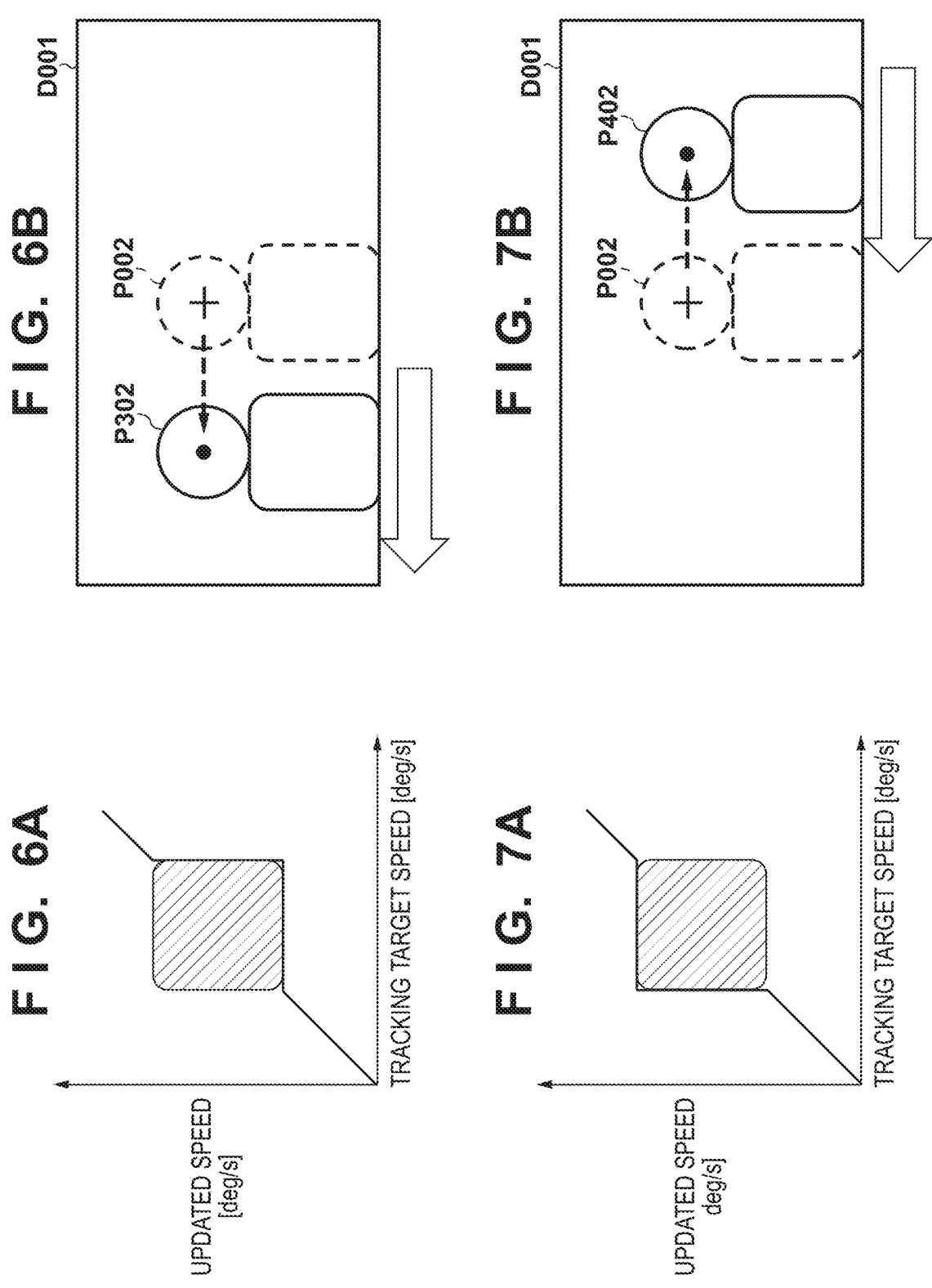

F I G. 8
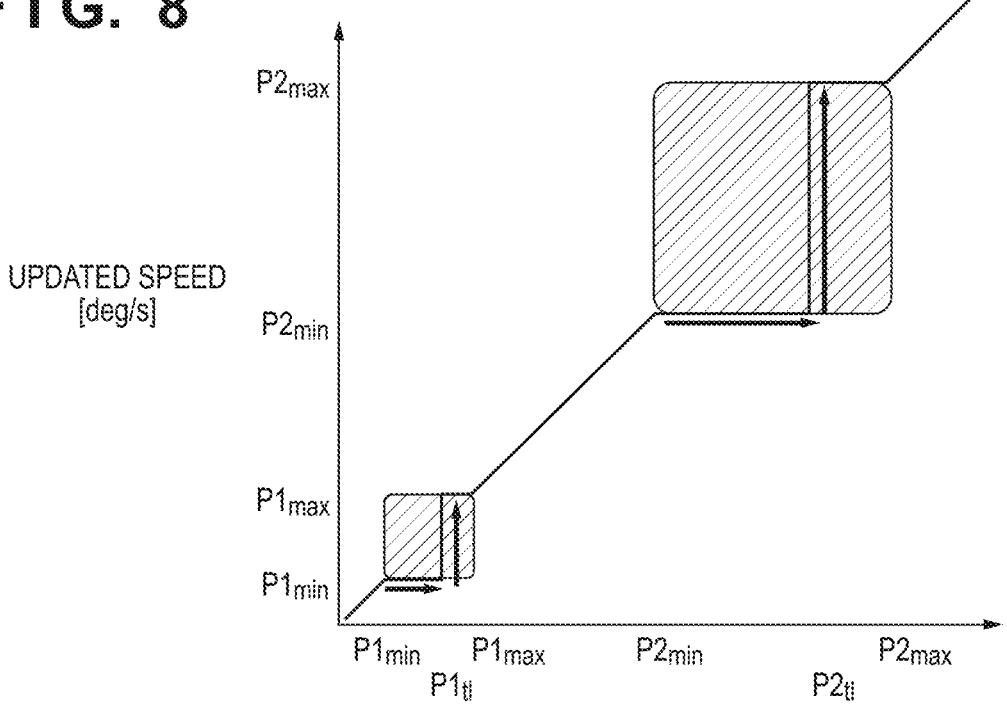
F I G. 9
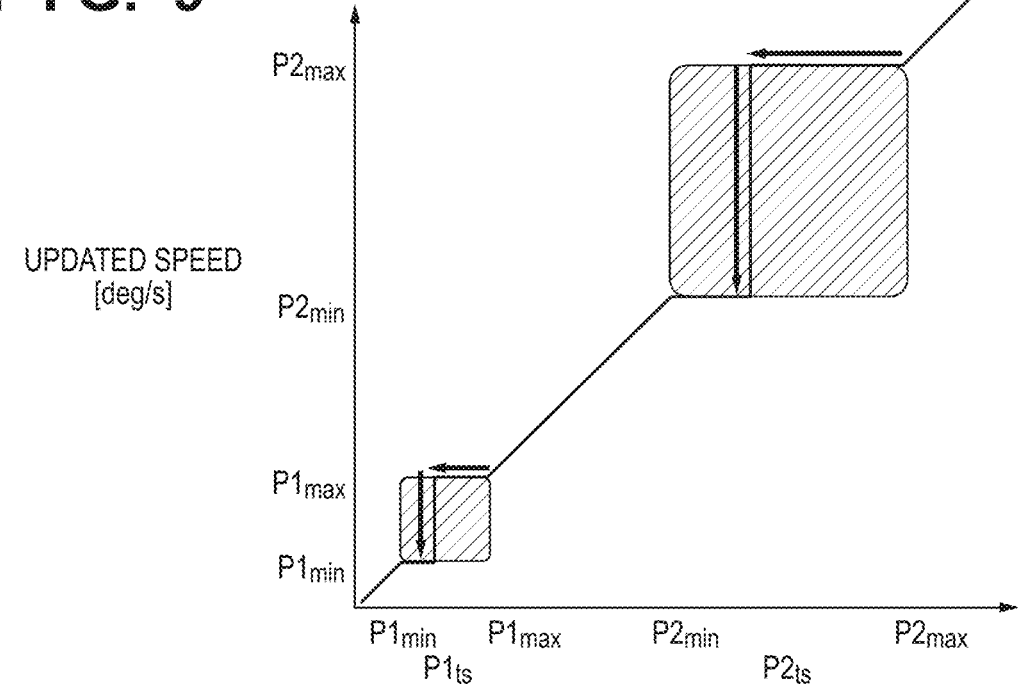

F I G. 11A

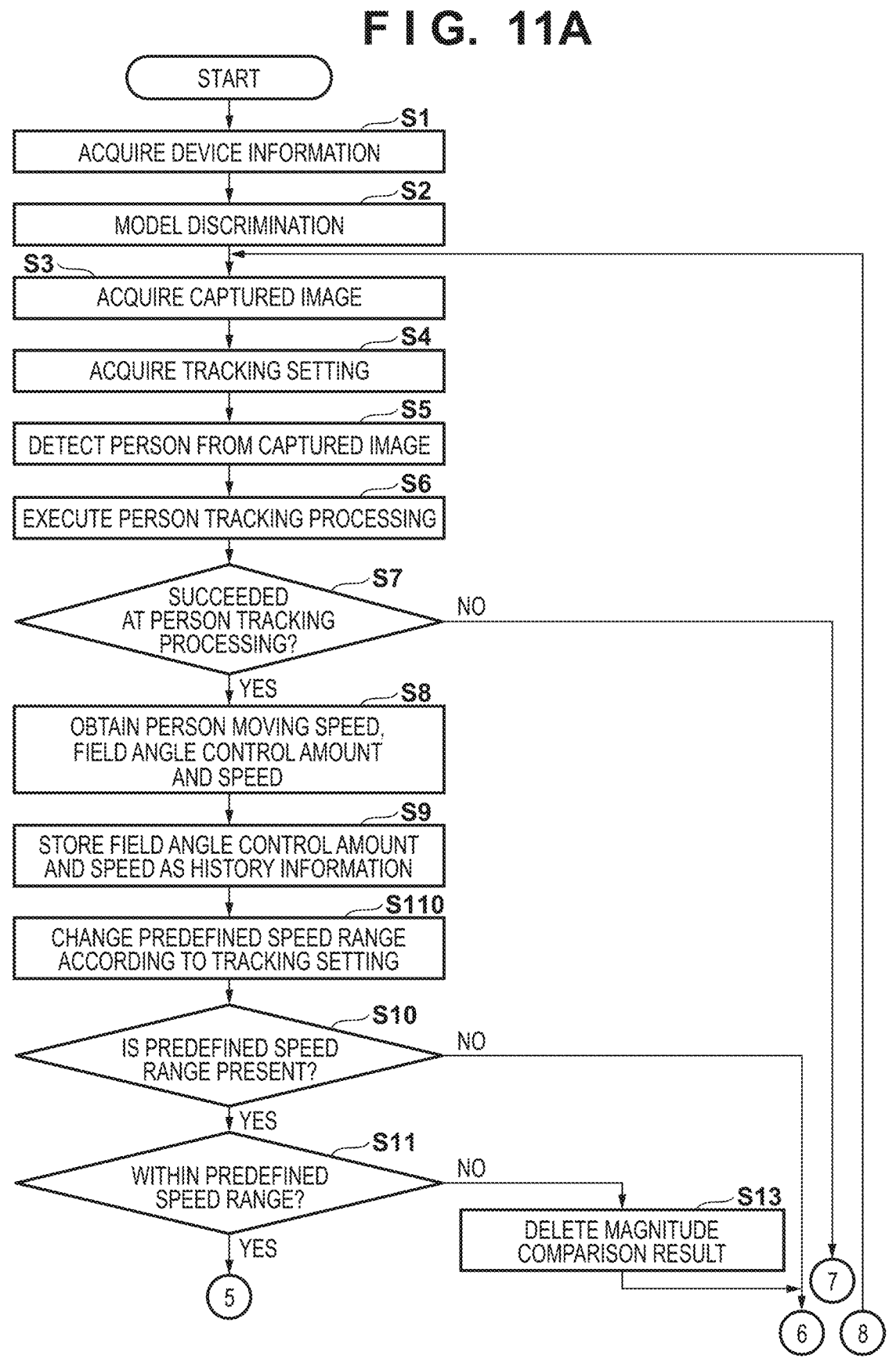

START

S1
ACQUIRE DEVICE INFORMATION

S2
MODEL DISCRIMINATION

S3
ACQUIRE CAPTURED IMAGE

S4
ACQUIRE TRACKING SETTING

S5
DETECT PERSON FROM CAPTURED IMAGE

S6
EXECUTE PERSON TRACKING PROCESSING

S7
SUCCEEDED AT PERSON TRACKING PROCESSING?  —— NO

YES

S8
OBTAIN PERSON MOVING SPEED, FIELD ANGLE CONTROL AMOUNT AND SPEED

S9
STORE FIELD ANGLE CONTROL AMOUNT AND SPEED AS HISTORY INFORMATION

S110
CHANGE PREDEFINED SPEED RANGE ACCORDING TO TRACKING SETTING

S10
IS PREDEFINED SPEED RANGE PRESENT?  —— NO

YES

S11
WITHIN PREDEFINED SPEED RANGE?  —— NO

S13
DELETE MAGNITUDE COMPARISON RESULT

YES

5

6    7    8

F I G. 12
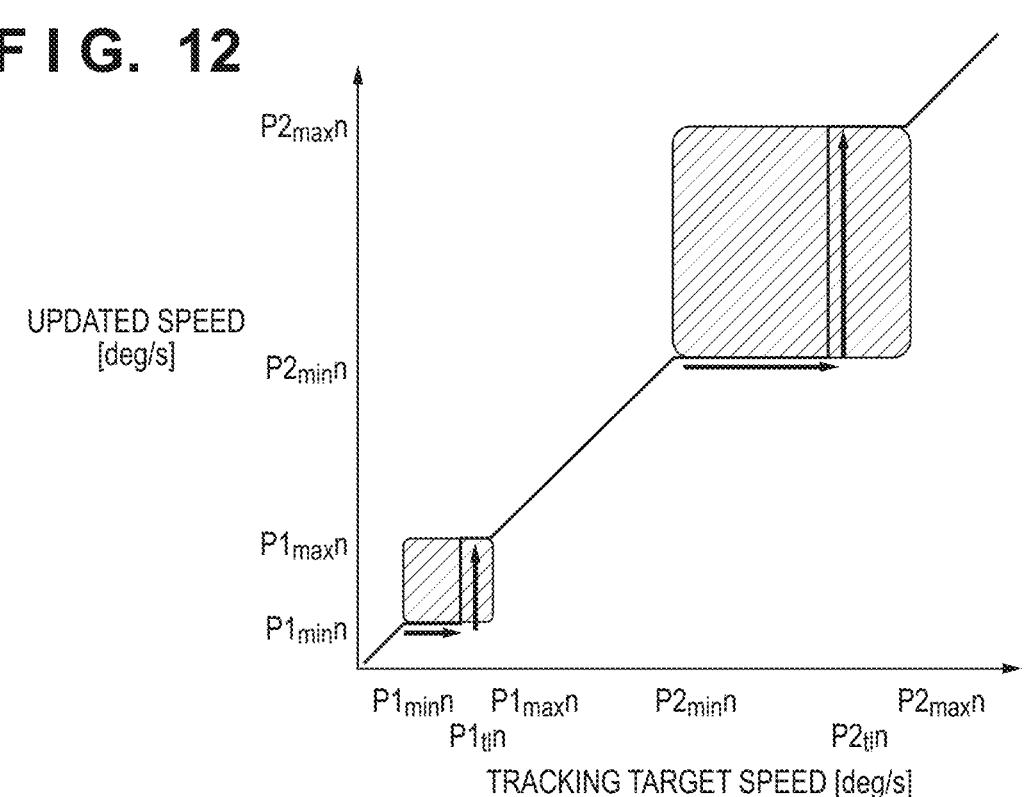
F I G. 13
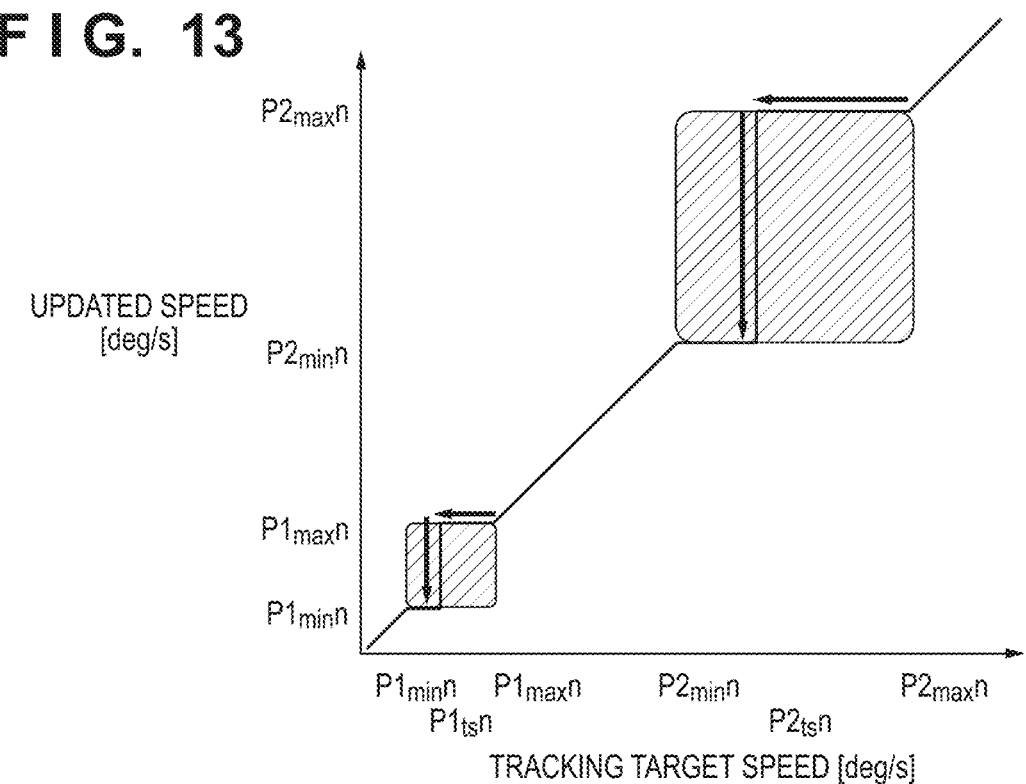

F I G. 14

1401 — CPU

1402 — RAM

1403 — ROM

STORAGE APPARATUS — 1404

I/F — 1405

1406

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to a tracking technique.

Description of the Related Art

In recent years, there has been a growing demand for automatically capturing an image of a dynamic scene such as a lecture and a sports scene by a remote camera. As a technique for achieving automatic image capturing, there has been known a technique of adjusting a field angle by performing pan, tilt, and zoom (hereinafter, referred to as PTZ) operations according to movement of a tracking target, thereby keeping the tracking target within the field of view.

In some cases, mechanical characteristics of a pan-tilt (PT) driving unit of a remote camera may cause vibration or noise due to resonance when driven within a certain speed range. In a remote camera used for a broadcasting purpose, video quality is also emphasized, and quiet operation and smooth PT control are required. Therefore, techniques have been disclosed for controlling speed while avoiding a certain speed range.

In the invention disclosed in Japanese Patent Laid-Open No. 2015-220723, in a case in which a speed is controlled at a specified acceleration, when the speed falls within a predetermined range, the specification of the speed within the predetermined range is avoided by performing speed control at an acceleration different from the specified acceleration.

In the invention disclosed in Japanese Patent Laid-Open No. 2005-020399, in a case in which synchronized PT control is performed, when a control speed of one with a less movement amount falls within a resonance speed range, it is avoided by re-setting a speed outside the resonance speed range.

In the invention disclosed in Japanese Patent Laid-Open No. 2015-220723, switching between two accelerations is performed so that the speed to be controlled does not fall within the predetermined range. With this, a lower speed or a higher speed outside the predetermined range is set. However, this method does not consider speed change hysteresis, which leads to a speed hunting issue. Further, minimizing the difference in speed before and after the change is not considered. Thus, performing speed control as described above results in a delay due to the speed after the change being slower than the speed before the change or overshooting due to it being faster, which leads to displacement of a capture position of the tracking target.

In the invention disclosed in Japanese Patent Laid-Open No. 2005-020399, the processing is based on the synchronized PT control. Automatic tracking calculates and controls a speed in real-time according to a constantly changing position of a tracking target, and hence the synchronized PT control cannot be performed. Therefore, it is not applicable to PT control for automatic tracking. Further, in the invention disclosed in Japanese Patent Laid-Open No. 2005-020399, when the control speed falls within the resonance range, the change to the re-set speed is performed. However, speed change hysteresis is not considered, which leads to a speed hunting issue.

SUMMARY OF THE INVENTION

The present invention provides a technique for mitigating frequent changes in speed and minimizing displacement of a capture position of a tracking target when a posture of an image capturing apparatus is changed at a changed speed that avoids a predefined speed range.

According to the first aspect of the present disclosure, there is provided an information processing apparatus configured to control an image capturing apparatus including a driving unit for driving in a pan direction or a tilt direction, the information processing apparatus comprising: an update unit configured to update a threshold value in a direction opposite to a change direction within a predefined speed range when a driving speed of the driving unit is changed across the threshold value within the predefined speed range; and a change unit configured to change the driving speed to a value equal to or greater than an upper limit value of the predefined speed range when a speed of a tracking target of the image capturing apparatus is equal to or greater than the threshold value within the predefined speed range, and change the driving speed to a value equal to or less than a lower limit value of the predefined speed range when the speed of the tracking target is less than the threshold value within the predefined speed range.

According to the second aspect of the present disclosure, there is provided an information processing method performed by an information processing apparatus configured to control an image capturing apparatus including a driving unit for driving in a pan direction or a tilt direction, the information processing method comprising: updating a threshold value in a direction opposite to a change direction within a predefined speed range when a driving speed of the driving unit is changed across the threshold value within the predefined speed range; and changing the driving speed to a value equal to or greater than an upper limit value of the predefined speed range when a speed of a tracking target of the image capturing apparatus is equal to or greater than the threshold value within the predefined speed range and changing the driving speed to a value equal to or less than a lower limit value of the predefined speed range when the speed of the tracking target is less than the threshold value within the predefined speed range.

According to the third aspect of the present disclosure, there is provided a non-transitory computer-readable storage medium storing therein a computer program for causing a computer to function as: a update unit configured to update a threshold value in a direction opposite to a change direction within a predefined speed range when a driving speed of a driving unit is changed across the threshold value within the predefined speed range, the driving unit being provided to an image capturing apparatus and driving in a pan direction or a tilt direction; and a change unit configured to change the driving speed to a value equal to or greater than an upper limit value of the predefined speed range when a speed of a tracking target of the image capturing apparatus is equal to or greater than the threshold value within the predefined speed range and change the driving speed to a value equal to or less than a lower limit value of the predefined speed range when the speed of the tracking target is less than the threshold value within the predefined speed range.

Further features of the present invention will become apparent from the following description of exemplary embodiments with reference to the attached drawings.

BRIEF DESCRIPTION OF THE DRAWINGS

FIG. 1 is a block diagram illustrating a functional configuration example of an automatic image capturing system.

FIG. 2A and FIG. 2B are flowcharts showing one example of an operation of a field angle adjustment apparatus 1004.

FIG. 3A and FIG. 3B are diagrams for describing a composition setting.

FIG. 5A to FIG. 5D are diagrams for describing the threshold value setting/update control method.

FIG. 6A and FIG. 6B are diagrams for describing a case in which a speed of field angle control within a predefined speed range is uniquely updated to a lower limit value of the predefined speed range.

FIG. 7A and FIG. 7B are diagrams for describing a case in which the speed of the field angle control within the predefined speed range is uniquely updated to an upper limit value of the predefined speed range.

FIG. 8 is a diagram for describing a speed update method by a speed update unit 1014.

FIG. 9 is a diagram for describing the speed update method by the speed update unit 1014.

FIG. 11A and FIG. 11B are flowcharts showing one example of an operation of a field angle adjustment apparatus 2004.

FIG. 12 is a diagram for describing a speed update method by a speed update unit 2014.

FIG. 13 is a diagram for describing the speed update method by the speed update unit 2014.

FIG. 14 is a block diagram illustrating a hardware configuration example of a computer apparatus.

DESCRIPTION OF THE EMBODIMENTS

Figure 2A:
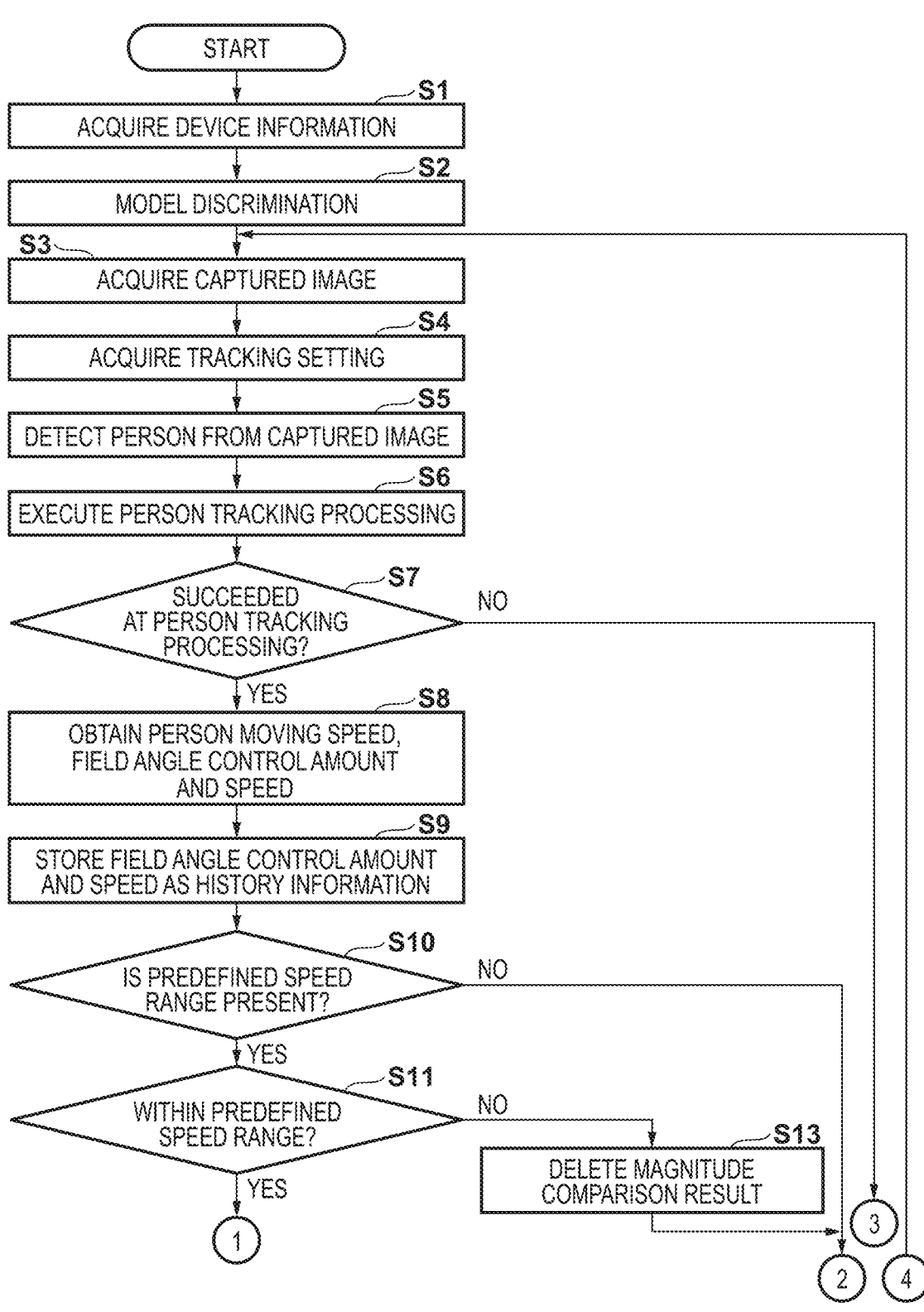

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

With reference to the block diagram of FIG. 1, description is made on a functional configuration example of an automatic image capturing system including a field angle adjustment apparatus functioning as an information processing apparatus that adjusts a posture of an image capturing apparatus (in other words, adjusts a field angle of the image capturing apparatus) so as to track and capture an image of a tracking target.

As illustrated in FIG. 1, the automatic image capturing system 1000 includes a video acquisition apparatus 1001, an input acquisition apparatus 1002, a PTZ driving apparatus

1003, a field angle adjustment apparatus 1004, and a monitor apparatus 1018. A method of connecting the apparatuses to each other is not limited to a particular method. For example, the three apparatuses including the video acquisition apparatus 1001, the input acquisition apparatus 1002, and the PTZ driving apparatus 1003 and the field angle adjustment apparatus 1004 may be connected via a network such as the Internet and LAN, and the field angle adjustment apparatus 1004 and the monitor apparatus 1018 may be connected via a video cable.

The automatic image capturing system 1000 executes tracking target tracking processing, based on a captured image being captured by the video acquisition apparatus 1001 and a tracking setting being acquired by the input acquisition apparatus 1002, and executes control of a field angle of the video acquisition apparatus 1001 (control of changing a field angle by changing one or more of pan, tilt, and zoom of the video acquisition apparatus 1001) by using the PTZ driving apparatus 1003 so as to keep the tracking target within the field angle. Herein, when a speed for executing the field angle control falls within a predefined speed range, the automatic image capturing system 1000 executes the field angle control at a speed of a value equal to or greater than the upper limit value of the predefined speed range or a value equal to or less than the lower limit value of the predefined speed range while mitigating frequent changes in speed of the field angle control and minimizing displacement of a capture position of the tracking target. Herein, the predefined speed range is a range of a speed for changing a posture of the video acquisition apparatus 1001 where vibration and noise are generated due to resonance (a range of a speed of the field angle control where vibration and noise are generated due to resonance). Further, the automatic image capturing system 1000 causes the monitor apparatus 1018 to display the captured image captured by executing the field angle control.

First, description is made on the video acquisition apparatus 1001. The video acquisition apparatus 1001 may be a moving image capturing apparatus that captures a moving image, or may be a still image capturing apparatus that captures a still image regularly or irregularly. When the video acquisition apparatus 1001 is a moving image capturing apparatus, the video acquisition apparatus 1001 outputs, as a captured image, an image in each frame of a captured moving image to the field angle adjustment apparatus 1004. Meanwhile, when the video acquisition apparatus 1001 is a still image capturing apparatus, the video acquisition apparatus 1001 outputs, as a captured image, a still image (frame) captured regularly or irregularly to the field angle adjustment apparatus 1004.

Next, description is made on the input acquisition apparatus 1002. The input acquisition apparatus 1002, which is a user interface such as a keyboard, a mouse, and a touch panel screen, can be operated by a user to input various instructions to the field angle adjustment apparatus 1004. For example, the input acquisition apparatus 1002 includes a touch panel screen that displays a graphical user interface (GUI) operating on a Web browser or the like and enables an operation input with respect to the GUI. A user operates the input acquisition apparatus 1002 to input the tracking setting including various settings for tracking and captures an image of the tracking target, and the input acquisition apparatus 1002 outputs the tracking setting being input to the field angle adjustment apparatus 1004. Description is made below on a case in which the tracking target is a person. The tracking target is not limited to a person, and the following description is similarly applicable to a case in which the tracking target is other than a person.

Next, description is made on the PTZ driving apparatus 1003. The PTZ driving apparatus 1003 includes a motor for controlling pan, tilt, and zoom of the video acquisition apparatus 1001, a circuit for controlling driving of the motor, and the like. The PTZ driving apparatus 1003 controls pan, tilt, and zoom of the video acquisition apparatus 1001 (field angle control) at a speed according to a PTZ control command from the field angle adjustment apparatus 1004 so as to achieve a pan angle, a tilt angle, and a zoom value according to the PTZ control command.

Next, description is made on the field angle adjustment apparatus 1004. The field angle adjustment apparatus 1004 is a computer apparatus that functions as an information processing apparatus, such as a camera, a personal computer (PC), a smartphone, and a tablet terminal apparatus. In the present embodiment, description is made while assuming that each of the function units of the field angle adjustment apparatus 1004 illustrated in FIG. 1 is implemented by hardware.

A video acquisition unit 1005 acquires the captured image being output from the video acquisition apparatus 1001.

The face detection unit 1006 detects a person from the captured image being acquired by the video acquisition unit 1005, and acquires coordinates of a face of the person in the captured image (for example, a center position of a region of the face). A method for detecting a face of a person from a captured image may be various methods such as the template matching method and the semantic segmentation method, and is not limited to a particular method. Since the template matching method and the semantic segmentation method are publicly known techniques, detailed description thereof is omitted.

A tracking setting unit 1007 acquires the tracking setting being output from the input acquisition apparatus 1002, and sets the tracking setting acquired to the field angle adjustment apparatus 1004. In the present embodiment, it is assumed that the tracking setting includes a composition setting and a tracking sensitivity setting. The tracking setting may additionally include a setting for determining an original tracking angle and the like.

Herein, with reference to FIG. 3A and FIG. 3B, description is made on the composition setting. The composition setting is a setting for continuously capturing a person at a particular position within a field angle even when the person moves within the field angle and continuously capturing the person at a particular size within the field angle even when the size of the person within the field angle is changed. In other words, it is assumed that the composition setting includes "a position of a person being continuously captured within a field angle (capture position)" and "a size of a person being continuously captured within a field angle (capture size)".

FIG. 3A illustrates one example of the composition setting, illustrating a composition in which a position P001 of a face of a person P002 is near a center position within a field angle range D001 so that the upper half of the person P002 is captured within the field angle range D001. The field angle adjustment apparatus 1004 to which the composition setting indicating the composition illustrated in FIG. 3A is set executes tracking and image capturing of the person within the composition illustrated in FIG. 3A.

FIG. 3B illustrates one example of the composition setting, illustrating a composition in which a position P003 of a face of a person P004 is near an upper right part within a field angle range D002 so that the entire body of the person P004 is captured within the field angle range D002. The field angle adjustment apparatus 1004 to which the composition setting indicating the composition illustrated in FIG. 3B is set executes tracking and image capturing of the person within the composition illustrated in FIG. 3B.

Next, description is made on the tracking sensitivity setting. The tracking sensitivity setting is setting information indicating rapidity for capturing a person within the composition indicated by the composition setting. Such setting information may be various types of information, and may be a plurality of stage values (a greater stage value indicates greater rapidity), for example. In the present embodiment, it is assumed that the tracking sensitivity setting is a time required for the field angle control to be executed for capturing the person within the composition indicated by the composition setting.

A recording unit 1008 stores the tracking setting acquired by the tracking setting unit 1007 in the memory in the field angle adjustment apparatus 1004.

A tracking processing unit 1009 executes the person tracking processing. When the tracking person processing is not executed previously, the tracking processing unit 1009 selects the person being the tracking target and starts the person tracking processing. When the person tracking processing is executed previously, the tracking processing unit 1009 executes the person tracking processing by using the coordinates of the face of the person that are acquired by the face detection unit 1006.

A method of selecting a person as the tracking target is not limited to a particular method as long as a face of a person who is the tracking target can be selected from one or more detected faces. For example, the tracking processing unit 1009 may select a face positioned at coordinates closest to the center position of the captured image.

The tracking processing is processing of specifying "coordinates of a face of a person who is a tracking target" in a captured image of a current frame by using "coordinates of a face of a person who is a tracking target" in a captured image of a past frame and "coordinates of a face of a person that are acquired by the face detection unit 1006" in the captured image of the current frame. Various types of processing are applicable to such processing. For example, the tracking processing unit 1009 predicts "coordinates of the face of the person who is the tracking target in the captured image of the current frame" from a movement history of the person who is the tracking target in the past (coordinates of the face of the person who is the tracking target in the captured image of each frame in the past). Further, the tracking processing unit 1009 specifies, as "the coordinates of the face of the person who is the tracking target" in the captured image of the current frame, coordinates closest to the predicated coordinates among the coordinates of the face of the person in the captured image of the current frame.

A calculation unit 1010 obtains an amount by which P, T, and Z are changed (field angle control amount) and a speed of the change (field angle control speed) so as to achieve the field angle control. With such field angle control, "the person who is the tracking target" is captured at the capture size indicated by the composition setting within the field angle and "the coordinates of the face of the person who is the tracking target" correspond to the capture position indicated by the composition setting. Herein, the "amount by which P, T, and Z is changed (field angle control amount)" includes a direction in which P, T, and Z are changed (field angle control direction) and a magnitude thereof.

The speed of the field angle control may be expressed by a freely selected unit. In the present embodiment, it is assumed that the speed of the field angle control is an angle [deg/s] by which a lens barrel of the video acquisition apparatus 1001 is moved per unit time. The calculation unit 1010 obtains the field angle control amount. With this field angle control amount, the size of the person who is the tracking target and the coordinates of the face of the person in the captured image of the current frame correspond to the capture size and the capture position that are indicated respectively by the composition setting. Further, the calculation unit 1010 obtains, as the speed of the field angle control, a value (speed) by dividing the field angle control amount by the time indicated by the tracking sensitivity setting. Note that a method for obtaining a speed and an amount of the field angle control is not limited to a particular method.

Further, the calculation unit 1010 obtains a moving speed [deg/s] of the person who is the tracking target in the captured image of the current frame. A method for obtaining the speed of the person who is the tracking target in the captured image of the current frame may be various methods, and is not limited to a particular method.

A model discrimination unit 1011 acquires the predefined speed range, based on model information acquired from the video acquisition apparatus 1001. A method for acquiring the predefined speed range based on the model information acquired from the video acquisition apparatus 1001 may be various methods, and is not limited to a particular method.

For example, when the model information relating to the video acquisition apparatus 1001 includes the predefined speed range, the model discrimination unit 1011 may acquire, from the model information acquired from the video acquisition apparatus 1001, the predefined speed range included in the model information.

Further, for example, when the field angle adjustment apparatus 1004 stores, in the memory, predefined speed ranges corresponding to various pieces of model information, the model discrimination unit 1011 may acquire the predefined speed range corresponding to the model information acquired from the video acquisition apparatus 1001 from the memory.

Note that the number of predefined speed ranges acquired based on the model information is not limited to one, and a plurality of predefined speed ranges may be obtained.

A necessity determination unit 1012 uses the speed of the field angle control that is obtained by the calculation unit 1010 and the predefined speed range that is acquired by the model discrimination unit 1011 to determine whether to update the speed. A method for such determination may be various methods, and is not limited to a particular method.

For example, the necessity determination unit 1012 may determine that the speed is to be updated when the speed of the field angle control falls within the predefined speed range, and may determine that the speed is not to be updated when the speed of the field angle control is outside the predefined speed range.

Further, for example, the necessity determination unit 1012 regards a range obtained by extending the predefined speed range by a predefined amount as a predefined extension speed range. Further, the necessity determination unit 1012 may determine that the speed is to be updated when the speed of the field angle control falls within the predefined extension speed range, and may determine that the speed is not to be updated when the speed of the field angle control is outside the predefined extension speed range.

Further, when the plurality of predefined speed ranges are given, the necessity determination unit 1012 executes similar processing for each of the predefined speed ranges. Further, the predefined speed range may be the same for all the operations of pan, tilt, and zoom, or may be set independently for each of the operations of pan, tilt, and zoom. Further, the same predefined speed range may be set for two of pan, tilt, and zoom.

Note that, when the model discrimination unit 1011 cannot acquire the predefined speed range, the necessity determination unit 1012 does not executed the above-mentioned determination processing, and determines that the speed of the field angle control is not to be updated.

When the necessity determination unit 1012 determines that the speed of the field angle control is to be updated, a threshold update unit 1013 controls setting/update of a threshold value that is set as a determination criterion for updating the speed of the field angle control. With reference to FIG. 4A to FIG. 4D and FIG. 5A to FIG. 5D, description is made on threshold value setting/update control method.

In FIG. 4A to FIG. 4D and FIG. 5A to FIG. 5D, the horizontal axis indicates the speed [deg/s] of the field angle control. A case in which two predefined speed ranges are present is illustrated. A lower limit value of one predefined speed range (the first predefined speed range) is $P1_{min}$, and an upper limit value thereof is $P1_{max}$. A lower limit value of the other predefined speed range (the second predefined speed range) is $P2_{min}$, and an upper limit value thereof is $P2_{max}$.

Figure 4A:
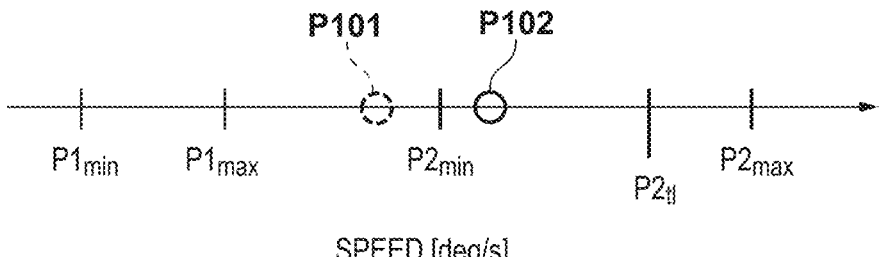
FIG. 4A to FIG. 4D are diagrams for describing a threshold value setting/update control method.

FIG. 4A illustrates a case in which a speed P102 of the field angle control that is currently obtained by the calculation unit 1010 is increased from "a previous speed P101 of the field angle control" and falls within the second predefined speed range, the previous speed P101 being greater than the upper limit value $P1_{max}$ and less than the lower limit value $P2_{min}$. In such a case, of P2*ts* being a value less than the center of the second predefined speed range and P2*tl* (>P2*ts*) being a value greater than the center of the second predefined speed range, the threshold update unit 1013 sets P2*tl* as the threshold value.

Figure 4B:
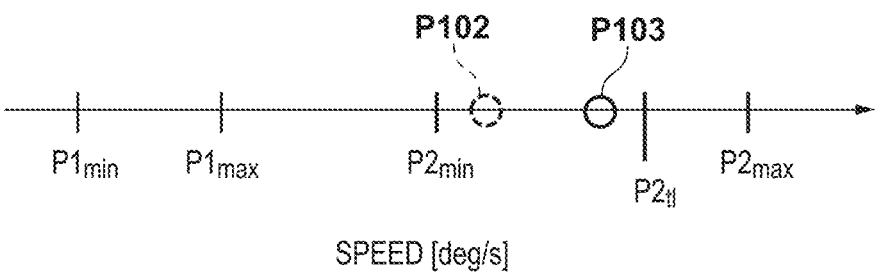

FIG. 4B illustrates a case in which a speed P103 of the field angle control that is currently obtained by the calculation unit 1010 is increased from "the previous speed P102 of the field angle control" and falls within the second predefined speed range without crossing the threshold value (=P2*tl*), the previous speed P102 falling within the second predefined speed range. In such a case, the threshold update unit 1013 does not update the threshold value (=P2*tl*).

Figure 4C:
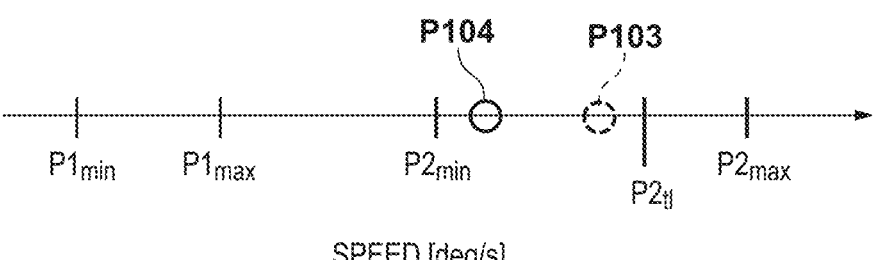

FIG. 4C illustrates a case in which a speed P104 of the field angle control that is currently obtained by the calculation unit 1010 is reduced from "the previous speed P103 of the field angle control" and falls within the second predefined speed range without crossing the threshold value (=P2*tl*), the previous speed P103 falling within the second predefined speed range. In such a case, the threshold update unit 1013 does not update the threshold value (=P2*tl*).

In other words, when "the magnitude relationship between the previous speed of the field angle control and the threshold value" and "the magnitude relationship between the speed of the field angle control that is currently obtained by the calculation unit 1010 and the threshold value" are not changed within the same predefined speed range, the threshold update unit 1013 does not update the threshold value.

Figure 4D:
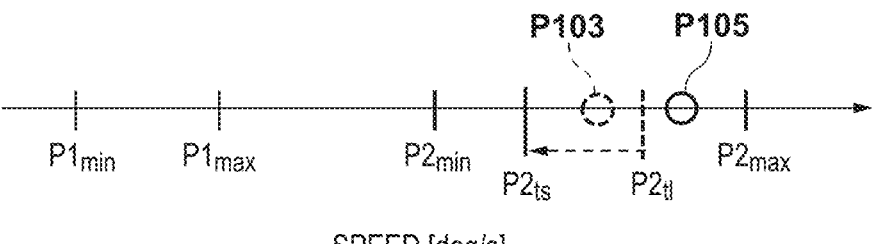

FIG. 4D illustrates a case in which a speed P105 of the field angle control that is currently obtained by the calculation unit 1010 is increased from "the previous speed P103 of the field angle control" and falls within the second predefined speed range while crossing the threshold value (=P2$tl$), the previous speed P103 falling within the second predefined speed range. In such a case, the threshold update unit 1013 updates the threshold value (=P2$tl$) to P2$ts$.

In other words, when "the magnitude relationship between the previous speed of the field angle control and the threshold value" and "the magnitude relationship between the speed of the field angle control that is currently obtained by the calculation unit 1010 and the threshold value" are changed within the same predefined speed range, the threshold update unit 1013 updates the threshold value.

FIG. 5A illustrates a case in which a speed P202 of the field angle control that is currently obtained by the calculation unit 1010 is reduced from "a previous speed P201 of the field angle control" and falls within the second predefined speed range, the previous speed P201 being greater than the upper limit value P2$_{max}$ of the second predefined speed range. In such a case, of P2$ts$ and P2$tl$, the threshold update unit 1013 sets P2$ts$ as the threshold value.

FIG. 5B illustrates a case in which a speed P203 of the field angle control that is currently obtained by the calculation unit 1010 is reduced from "the previous speed P202 of the field angle control" and falls within the second predefined speed range without crossing the threshold value (=P2$ts$), the previous speed P202 falling within the second predefined speed range. In such a case, the threshold update unit 1013 does not update the threshold value (=P2$ts$).

FIG. 5C illustrates a case in which a speed P204 of the field angle control that is currently obtained by the calculation unit 1010 is increased from "the previous speed P203 of the field angle control" and falls within the second predefined speed range without crossing the threshold value (=P2$ts$), the previous speed P203 falling within the second predefined speed range. In such a case, the threshold update unit 1013 does not update the threshold value (=P2$ts$). In other words, similarly to the cases in FIG. 4A to FIG. 4D, in the cases in FIG. 5A to FIG. 5D, when "the magnitude relationship between the previous speed of the field angle control and the threshold value" and "the magnitude relationship between the speed of the field angle control that is currently obtained by the calculation unit 1010 and the threshold value" are not changed within the same predefined speed range, the threshold update unit 1013 does not update the threshold value.

FIG. 5D illustrates a case in which a speed P205 of the field angle control that is currently obtained by the calculation unit 1010 is reduced from "the previous speed P203 of the field angle control" and falls within the second predefined speed range while crossing the threshold value (=P2$ts$), the previous speed P203 falling within the second predefined speed range. In such a case, the threshold update unit 1013 updates the threshold value (=P2$ts$) to P2$tl$.

In other words, similarly to the cases in FIG. 4A to FIG. 4D, in the cases in FIG. 5A to FIG. 5D, when "the magnitude relationship between the previous speed of the field angle control and the threshold value" and "the magnitude relationship between the speed of the field angle control that is currently obtained by the calculation unit 1010 and the threshold value" are changed within the same predefined speed range, the threshold update unit 1013 updates the threshold value.

In other words, when the speed of the field angle control is changed within the predefined speed range while crossing the threshold value, the threshold update unit 1013 re-sets (updates) the threshold value in a direction opposite to the change direction within the predefined speed range.

The description given above involves a case in which the speed of the field angle control is changed from the speed outside the second predefined speed range to the speed falling within the second predefined speed range and a case in which the speed of the field angle control is changed within the second predefined speed range. The description is similarly applicable to a case in which another predefined speed range is a target.

A speed update unit 1014 uses the threshold value and the predefined speed range that is acquired by the model discrimination unit 1011 to update the speed of the field angle control that is obtained by the calculation unit 1010. Herein, in a method of updating the speed of the field angle control within the predefined speed range uniquely to the lower limit value of the predefined speed range, which is illustrated in FIG. 6A, or updating the same uniquely to the upper limit value of the predefined speed range, which is illustrated in FIG. 7A, a difference between the speed of the person who is the tracking target and the updated speed of the field angle control is increased. Consequently, displacement between the capture position specified in the composition setting and the actual position of the tracking target is significant. In FIG. 6A and FIG. 7A, the horizontal axis indicates the speed [deg/s] of the person who is the tracking target, and the vertical axis indicates the updated speed [deg/s] of the field angle control.

In FIG. 6A, when the speed of the person who is the tracking target falls within the predefined speed range, the speed of the field angle control is updated uniquely to the lower limit value of the predefined speed range. In a case in which a person P302 who is the tracking target moves from the right to the left as indicated with the arrow, which is illustrated in FIG. 6B, when such speed update is executed, the speed of the field angle control is slower than the moving speed. Thus, the person P302 is displaced from the person P002 to the left side in the field angle range D001 of the composition illustrated in FIG. 3A.

In FIG. 7A, when the speed of the person who is the tracking target falls within the predefined speed range, the speed of the field angle control is updated uniquely to the upper limit value of the predefined speed range. In a case in which a person P402 who is the tracking target moves from the right to the left as indicated with the arrow, which is illustrated in FIG. 7B, when such speed update is executed, the speed of the field angle control is higher than the moving speed. Thus, the person P402 is displaced from the person P002 to the right side in the field angle range D001 of the composition illustrated in FIG. 3A.

In the present embodiment, in order to suppress such positional displacement from the composition, the threshold value that is set/updated as described above is used. In other words, in the present embodiment, when the speed of the person who is the tracking target falls within the predefined speed range and is equal to or greater than the threshold value, the speed of the field angle control is changed to a value equal to or greater than the upper limit value of the predefined speed range. When the speed of the person who is the tracking target falls within the predefined speed range and is less than the threshold value, the speed of the field angle control is changed to a value equal to or less than the lower limit value of the predefined speed range. As described above, when the speed of the field angle control is changed within the predefined speed range while crossing the threshold value, the threshold value is re-set in a direction opposite to the change direction within the predefined speed range. Thus, even when the speed of the field angle control that is obtained by the calculation unit 1010 fluctuates above and below the threshold value, the speed of the field angle control is not frequently updated.

With reference to FIG. 8 and FIG. 9, description is made on the speed update method by the speed update unit 1014. In FIG. 8 and FIG. 9, the horizontal axis indicates the speed [deg/s] of the person who is the tracking target, and the vertical axis indicates the updated speed [deg/s] of the field angle control.

FIG. 8 illustrates a case in which a value less than the center of the predefined speed range is set as the threshold value. In FIG. 8, when the speed of the person who is the tracking target falls within the first predefined speed range P1$tl$ and is equal to or greater than the threshold value, the speed of the field angle control is changed to the upper limit value P1$_{max}$. Further, in FIG. 8, when the speed of the person who is the tracking target falls within the first predefined speed range P1$tl$ and is less than the threshold value, the speed of the field angle control is changed to the lower limit value P1$_{min}$. Further, when the speed of the person who is the tracking target falls within the second predefined speed range P2$tl$ and is equal to or greater than the threshold value, the speed of the field angle control is changed to the upper limit value P2$_{max}$. Further, when the speed of the person who is the tracking target falls within the second predefined speed range P2$tl$ and is less than the threshold value, the speed of the field angle control is changed to the lower limit value P2$_{min}$.

FIG. 9 illustrates a case in which a value less than the center of the predefined speed range is set as the threshold value. In the case illustrated in FIG. 9, the method of changing the speed of the field angle control is similar to that in the case illustrated in FIG. 8.

A history information holding unit 1015 registers results of processing by various functional units as history information in the memory of the field angle adjustment apparatus 1004. The history information may include the previous speed of the field angle control, "the coordinates of the face of the person who is the tracking target" in the captured image of the past frame, pan, tilt, and zoom of the video acquisition apparatus 1001 when the captured image of the previous frame is captured, the movement history of the person who was the tracking target in the past, and the like. Further, such history information may be used as appropriate by various functional units.

A field angle operation unit 1016 generates a PTZ control command including the speed of the field angle control that is obtained by the calculation unit 1010 or is changed by the speed update unit 1014 and the field angle control amount that is obtained by the calculation unit 1010. Further, the field angle operation unit 1016 outputs the generated PTZ control command to the PTZ driving apparatus 1003.

With this, the PTZ driving apparatus 1003 controls pan, tilt, and zoom of the video acquisition apparatus 1001 (the field angle control) at the speed of the field angle control that is obtained by the calculation unit 1010 or is changed by the speed update unit 1014 so that a pan angle, a tilt angle, and a zoom value that correspond to the field angle control amount that is obtained by the calculation unit 1010 are obtained.

A video output unit 1017 outputs the captured image acquired by the video acquisition unit 1005 to the monitor apparatus 1018. The monitor apparatus 1018 is a display apparatus such as a liquid crystal screen and a touch panel screen, and displays the captured image output from the video output unit 1017. A control unit 99 executes operation control of the field angle adjustment apparatus 1004 as a whole.

Next, according to the flowcharts in FIGS. 2A and 2B, description is made on one example of an operation of the field angle adjustment apparatus 1004 configured as illustrated in FIG. 1. The processing according to the flowcharts in FIGS. 2A and 2B is started when the field angle adjustment apparatus 1004 is activated by a user operation with respect to the automatic image capturing system 1000.

In step S1, the model discrimination unit 1011 acquires the model information from the video acquisition apparatus 1001. Further, in step S2, the model discrimination unit 1011 executes model discrimination, based on the model information being acquired, and acquires the predefined speed range corresponding to the model of the video acquisition apparatus 1001.

In step S3, the video acquisition unit 1005 acquires the captured image output from the video acquisition apparatus 1001. In step S4, the tracking setting unit 1007 acquires the tracking setting output from the input acquisition apparatus 1002, and sets the tracking setting acquired to the field angle adjustment apparatus 1004. Further, the recording unit 1008 stores the tracking setting acquired by the tracking setting unit 1007 in the memory in the field angle adjustment apparatus 1004.

In step S5, the face detection unit 1006 detects the person from the captured image acquired by the video acquisition unit 1005 in step S3, and acquires the coordinates of the face of the person in the captured image.

In step S6, the tracking processing unit 1009 executes the person tracking processing. Further, in step S7, the tracking processing unit 1009 determines whether the person tracking processing for has succeeded. As a result of this determination, when the person tracking processing has succeeded, the processing proceeds to step S8. When the person tracking processing has not succeeded, the processing proceeds to step S26.

In step S8, the calculation unit 1010 obtains the field angle control amount and the speed of the field angle control, based on the tracking setting. Further, the calculation unit 1010 obtains the moving speed of the person who is the tracking target in the captured image of the current frame.

In step S9, the history information holding unit 1015 stores the field angle control amount and the field angle control speed that are obtained by the calculation unit 1010 in step S8 as the history information in the memory. In step S10, the necessity determination unit 1012 determines whether the predefined speed range is successfully acquired in step S2 described above. As a result of this determination, when the predefined speed range is successfully acquired (the model in operation has a predefined speed range), the processing proceeds to step S11. On the other hand, when acquisition of the predefined speed range fails (the model in operation does not have a predefined speed range), the necessity determination unit 1012 outputs, to the field angle operation unit 1016, "the field angle control amount and the field angle control speed" that are stored as the history information in the memory in step S9. Further, the processing proceeds to step S25.

In step S11, the necessity determination unit 1012 determines whether the speed of the field angle control that is obtained by the calculation unit 1010 falls within the predefined speed range that is acquired by the model discrimination unit 1011. As a result of this determination, when the speed of the field angle control that is obtained by the calculation unit 1010 falls within the predefined speed range that is acquired by the model discrimination unit 1011, the processing proceeds to step S12. On the other hand, when the speed of the field angle control that is obtained by the calculation unit 1010 is outside the predefined speed range that is acquired by the model discrimination unit 1011, the processing proceeds to step S13.

In step S12, the threshold update unit 1013 determines whether the speed of the previous field angle control falls within the same predefined speed range as the predefined speed range to which the speed of the current field angle control belongs. As a result of this determination, when the speed of the previous field angle control falls within the same predefined speed range as the predefined speed range to which the speed of the current field angle control belongs, the processing proceeds to step S17. On the other hand, when the speed of the previous field angle control does not fall within the same predefined speed range as the predefined speed range to which the speed of the current field angle control belongs, the processing proceeds to step S14.

In step S14, the threshold update unit 1013 determines whether the speed of the current field angle control is greater than the speed of the previous field angle control. As a result of this determination, when the speed of the current field angle control is higher than the speed of the previous field angle control, the processing proceeds to step S15. When the speed of the current field angle control is lower than the speed of the previous field angle control, the processing proceeds to step S16.

In step S15, the threshold update unit 1013 sets, as the threshold value, a value that falls within the predefined speed range to which the speed of the current field angle control belongs and is greater than the center of the predefined speed range. In step S16, the threshold update unit 1013 sets, as the threshold value, a value that falls within the predefined speed range to which the speed of the current field angle control belongs and is less than the center of the predefined speed range.

In step S17, the threshold update unit 1013 performs magnitude comparison between the speed of the current field angle control and the threshold value. In step S18, the threshold update unit 1013 determines whether the condition that ""a result of magnitude comparison between the speed of the field angle control and the threshold value (magnitude comparison result)" is not obtained previously or the previous magnitude comparison result and the current magnitude comparison result are the same" is satisfied. As a result of this determination, when this condition is satisfied, the processing proceeds to step S22. On the other hand, when this condition is not satisfied, the processing proceeds to step S19.

In step S19, the threshold update unit 1013 determines whether the magnitude comparison result in step S17 indicates that "the speed of the current field angle control is greater than the threshold value" or "the speed of the current field angle control is less than the threshold value".

As a result of this determination, when the magnitude comparison result in step S17 indicates that "the speed of the current field angle control is greater than the threshold value", the processing proceeds to step S20. On the other hand, when the magnitude comparison result described above indicates that "the speed of the current field angle control is less than the threshold value", the processing proceeds to step S21.

In step S20, the threshold update unit 1013 updates the threshold value to "the value that falls within the predefined speed range to which the speed of the current field angle control belongs and is less than the center of the predefined speed range". In step S21, the threshold update unit 1013 updates the threshold value to "the value that falls within the predefined speed range to which the speed of the current field angle control belongs and is greater than the center of the predefined speed range".

In step S22, the speed update unit 1014 updates the speed of the field angle control that is obtained by the calculation unit 1010. In other words, when the speed of the field angle control that is obtained by the calculation unit 1010 is less than the threshold value, the speed update unit 1014 updates the speed to a value equal to or less than the lower limit value of the predefined speed range to which the speed belongs. On the other hand, when the speed of the field angle control that is obtained by the calculation unit 1010 is greater than the threshold value, the speed update unit 1014 updates the speed to a value equal to or greater than the upper limit value of the predefined speed range to which the speed belongs.

In step S24, the history information holding unit 1015 stores the magnitude comparison result in step S17 and the determination result in step S11 as the history information in the memory of the field angle adjustment apparatus 1004. On the other hand, in step S13, the history information holding unit 1015 deletes "the magnitude comparison result" which is the history information stored in the memory.

In step S25, the field angle operation unit 1016 generates the PTZ control command including the speed of the field angle control that is obtained by the calculation unit 1010 or is changed by the speed update unit 1014 and the field angle control amount that is obtained by the calculation unit 1010. Further, the field angle operation unit 1016 outputs the generated PTZ control command to the PTZ driving apparatus 1003.

In step S26, the video output unit 1017 outputs the captured image acquired by the video acquisition unit 1005 in step S3 to the monitor apparatus 1018. In step S27, the control unit 99 determines whether a termination condition of the processing (automatic image capturing processing) according to the flowcharts in FIGS. 2A and 2B is satisfied. For example, when it is detected that a user operates a switch for switching ON/OFF of the power of the automatic image capturing system 1000 to perform an operation of turning off the power, the control unit 99 determines that the termination condition is satisfied.

As the result of determination, when the termination condition is satisfied, the processing according to the flowcharts in FIGS. 2A and 2B is terminated. On the other hand, when the termination condition is not satisfied, the processing proceeds to Step S3.

In this manner, in the present embodiment, when the PTZ control is executed at a speed outside the predefined speed range, the speed is updated according to a result of magnitude comparison between the calculated speed of the field angle control and the threshold value set based on the transition history of the speed of the field angle control. With this, generation of vibration at the time of driving of the video acquisition apparatus 1001 can be reduced while mitigating frequent changes in speed and minimizing displacement of a capture position of the tracking target.

Second Embodiment

Figure 10:
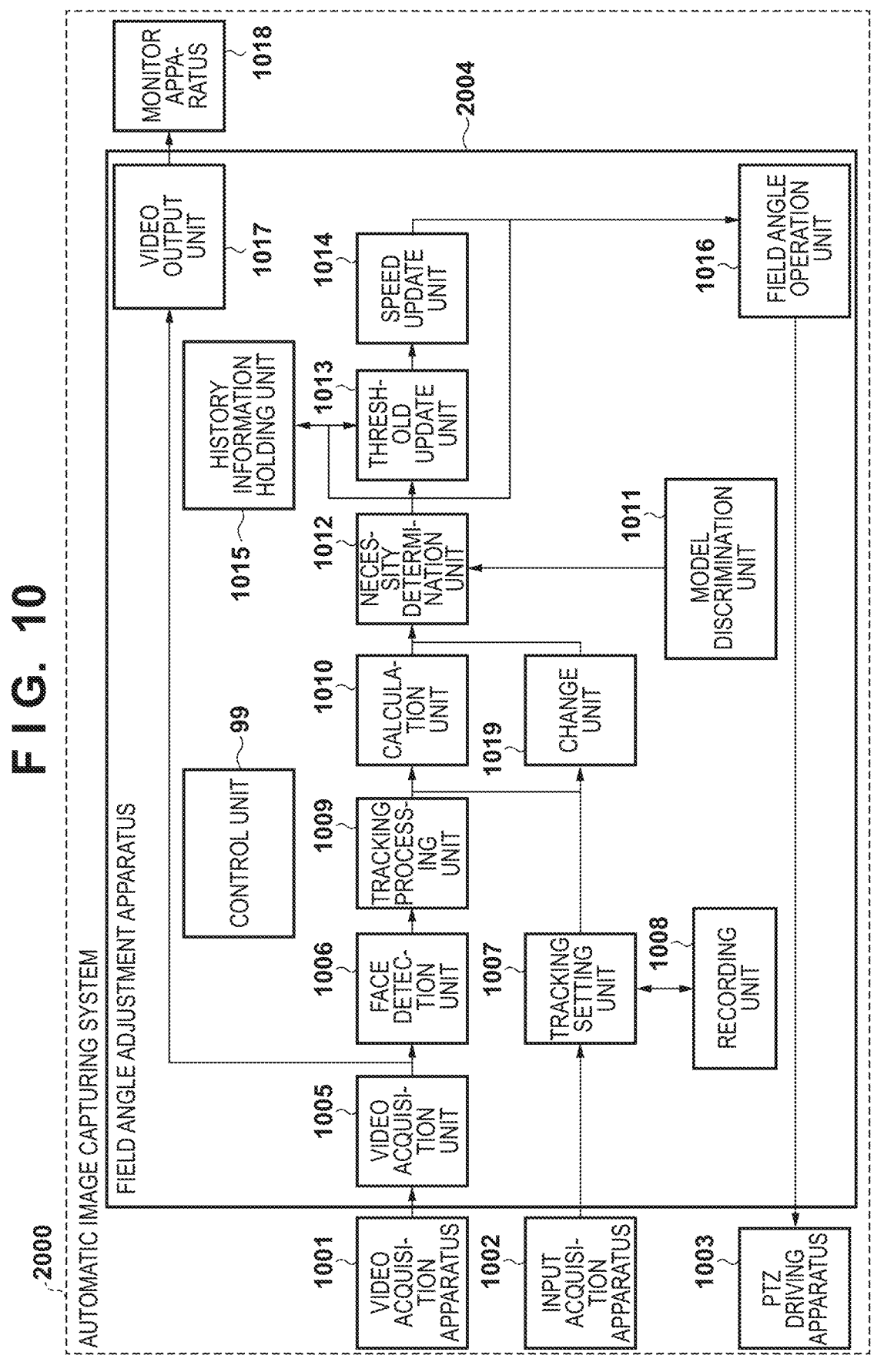
FIG. 10 is a block diagram illustrating a functional configuration example of an automatic image capturing system 2000.

In the following embodiments including the present embodiment and a variation example, only the difference from the first embodiment is described, assuming that they are similar to the first embodiment unless otherwise stated. With reference to the block diagram of FIG. 10, description is made on a functional configuration example of an automatic image capturing system 2000 according to the present embodiment. As illustrated in FIG. 10, the automatic image capturing system 2000 is configured by replacing the field angle adjustment apparatus 1004 in FIG. 1 with a field angle adjustment apparatus 2004. In the present embodiment, description is made while assuming that each of the function units of the field angle adjustment apparatus 2004 illustrated in FIG. 10 is implemented by hardware.

A change unit 1019 changes the width of the predefined speed range according to the tracking sensitivity setting included in the tracking setting. When the predefined speed range is wide in consideration of individual differences depending on a model, a difference between the speed of the person and the updated speed of the field angle control is increased. Consequently, displacement between the capture position specified in the composition setting and the actual position of the tracking target is significant. In this case, there may be a risk that a part of the tracking target is cut out of the field angle. When the moving speed of the tracking target is high, the risk of such cutout is high. Thus, the width of the predefined speed range is changed according to the tracking sensitivity setting indicating rapidity for capturing the tracking target within the set composition. Note that the width may be changed according to the magnitude of the speed of the predefined speed range, or the width of the predefined speed range may be changed by combining those approaches. For example, when the plurality of predefined speed ranges are present, control such as narrowing only the width of the largest predefined speed range by the highest setting of the tracking sensitivity setting is considered.

A speed update unit 2014 updates the speed of the field angle control similarly to the speed update unit 1014 described above. However, since the width of the predefined speed range is controlled according to the tracking sensitivity setting, the speed update unit 2014 is different from the first embodiment in that the upper limit value and the lower limit value are values controlled according to the tracking sensitivity setting.

With reference to FIG. 12 and FIG. 13, description is made on the speed update method by the speed update unit 2014. In FIG. 12 and FIG. 13, the horizontal axis indicates the speed [deg/s] of the person who is the tracking target, and the vertical axis indicates the updated speed [deg/s] of the field angle control. A case in which two predefined speed ranges are present is illustrated. A lower limit value of one predefined speed range (the first predefined speed range) is $P1_{min}n$, and an upper limit value thereof is $P1_{max}n$. A lower limit value of the other predefined speed range (the second predefined speed range) is $P2_{min}n$, and an upper limit value thereof is $P2_{max}n$. All of $P1_{min}n$, $P1_{max}n$, $P2_{min}n$, and $P2_{max}n$ are values that are controlled according to the tracking sensitivity setting. Thus, the threshold values $P1_{tl}n$ and $P2_{tl}n$ that are determined depending on those values are also controlled according to the tracking sensitivity setting.

FIG. 12 illustrates a case in which a value greater than the center of the predefined speed range is set as the threshold value. FIG. 13 illustrates a case in which a value less than the center of the predefined speed range is set as the threshold value.

Figure 11B:
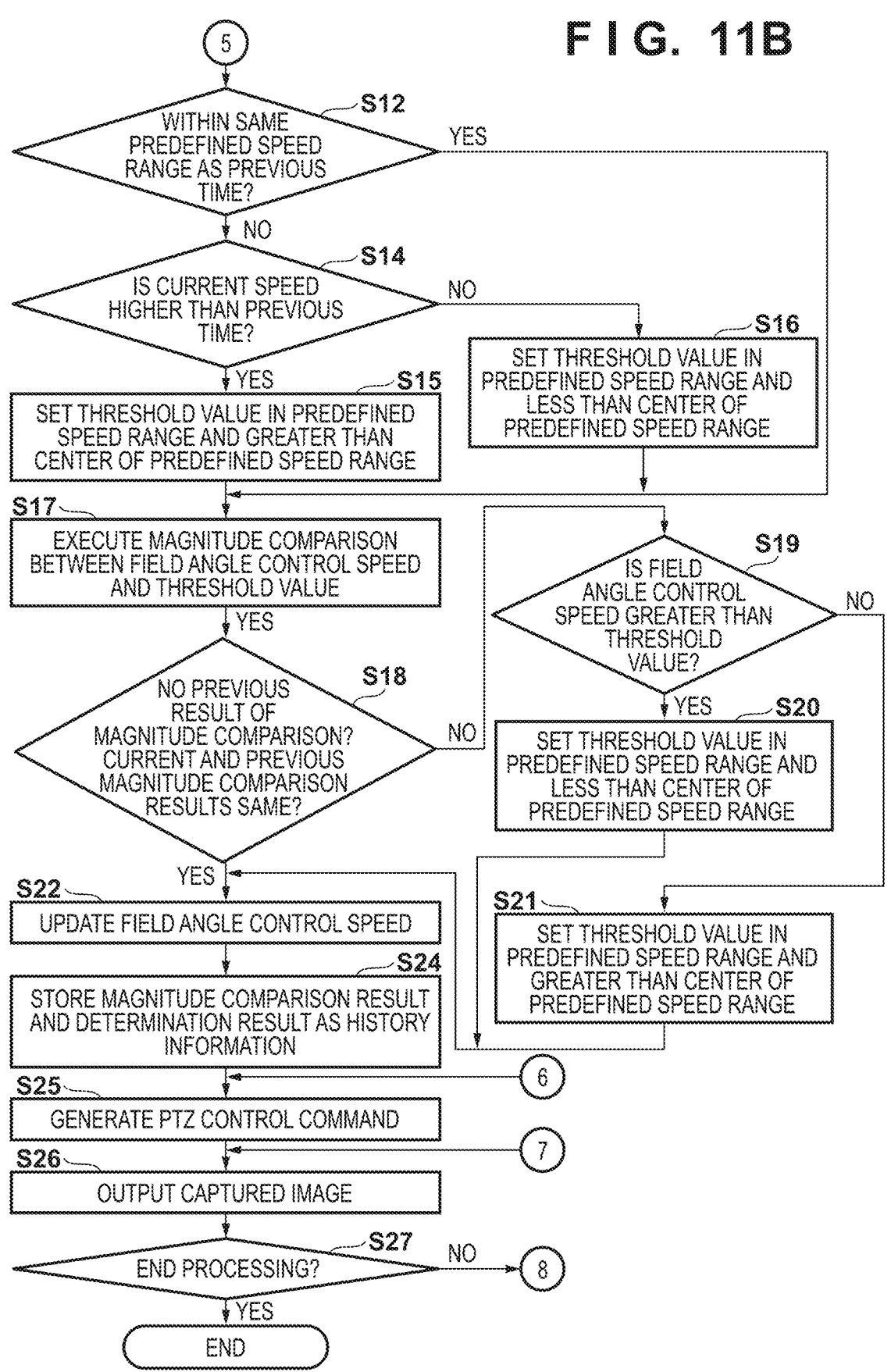

Next, according to the flowcharts in FIGS. 11A and 11B, description is made on one example of an operation of the field angle adjustment apparatus 2004 configured as illustrated in FIG. 10. The processing according to the flowcharts in FIGS. 11A and 11B is started when the field angle adjustment apparatus 1004 is activated by a user operation with respect to the automatic image capturing system 1000. In FIG. 10, processing steps similar to the processing steps illustrated in FIGS. 2A and 2B are provided with the same step numbers, and description of those processing steps is omitted. In step S110, the change unit 1019 changes the width of the predefined speed range according to the tracking sensitivity setting included in the tracking setting.

Variation Example

There may be executed control of not changing the speed of the field angle control until the number of times when the magnitude relationship between the speed of the tracking target and the threshold value is successively changed within the predefined speed range reaches a predefined number and permitting a change of the speed of the field angle control after the number reaches the predefined number. With this, frequent change in speed can be suppressed.

Further, in a case in which the speed transition is from the outside to the inside of the predefined speed range, when the transition is acceleration, the threshold value that is less than the center of the predefined speed range may be set. When the transition is deceleration, the threshold value that is greater than the center of the predefined speed range may be set.

Further, in the second embodiment, the width of the predefined speed range may be changed according to "the capture position of the tracking target within the field angle" that is predefined by the composition setting. For example, as the capture position is closer to the field angle center position, the predefined speed range may be narrower.

Third Embodiment

In the first embodiment, description is made while assuming that each of the function units of the field angle adjustment apparatus 1004 illustrated in FIG. 1 is implemented by hardware. In the second embodiment, description is made while assuming that each of the function units of the field angle adjustment apparatus 2004 illustrated in FIG. 10 is implemented by hardware. However, the functional units illustrated in FIG. 1 and FIG. 10 may be implemented by software (computer programs). In this case, a computer apparatus that can execute the computer programs is applicable to the field angle adjustment apparatus 1004 or the field angle adjustment apparatus 2004. With reference to the block diagram of FIG. 14, description is made on a hardware configuration example of such a computer apparatus.

A CPU 1401 executes various processing using computer programs and data stored in a RAM 1402. With this, the CPU 1401 executes operation control of the computer apparatus as a whole, and executes or controls various types of processing described as processing to be executed by the field angle adjustment apparatus 1004 or the field angle adjustment apparatus 2004.

The RAM 1402 includes an area for storing computer programs and data loaded from a ROM 1403 or a storage apparatus 1404, or an area for storing data received from the outside via an I/F 1405. The RAM 1402 further includes a work area used when the CPU 1401 executes various types of processing. In this manner, the RAM 1402 may provide various areas as appropriate.

In the ROM 1403, setting data of the computer apparatus, computer programs and data related to activation of the computer apparatus, computer programs and data related to basic operations of the computer apparatus, or the like are stored.

The storage apparatus 1404 is a large-capacity non-volatile memory device, such as a hard disk drive device and an EEPROM. An operating system (OS), computer programs and data for causing the CPU 1401 to execute or control various types of processing described as processing to be executed by the field angle adjustment apparatus 1004 or the field angle adjustment apparatus 2004, or the like are stored in the storage apparatus 1404. The computer programs stored in the storage apparatus 1404 includes a computer program for causing the CPU 1401 to execute or control the functions of the functional units of the field angle adjustment apparatus 1004 and the field angle adjustment apparatus 2004 illustrated in FIG. 1 and FIG. 10. Further, the data stored in the storage apparatus 1404 includes various types of data described as known information. The computer programs and data stored in the storage apparatus 1404 are loaded into the RAM 1402 as appropriate according to the control by the CPU 1401, and are subjected to processing by the CPU 1401.

The I/F 1405 functions as an interface that performs data communication with an external apparatus. For example, the video acquisition apparatus 1001, the input acquisition apparatus 1002, the PTZ driving apparatus 1003, the monitor apparatus 1018, and the like that are described above may be connected to the I/F 1405.

Figure 14:
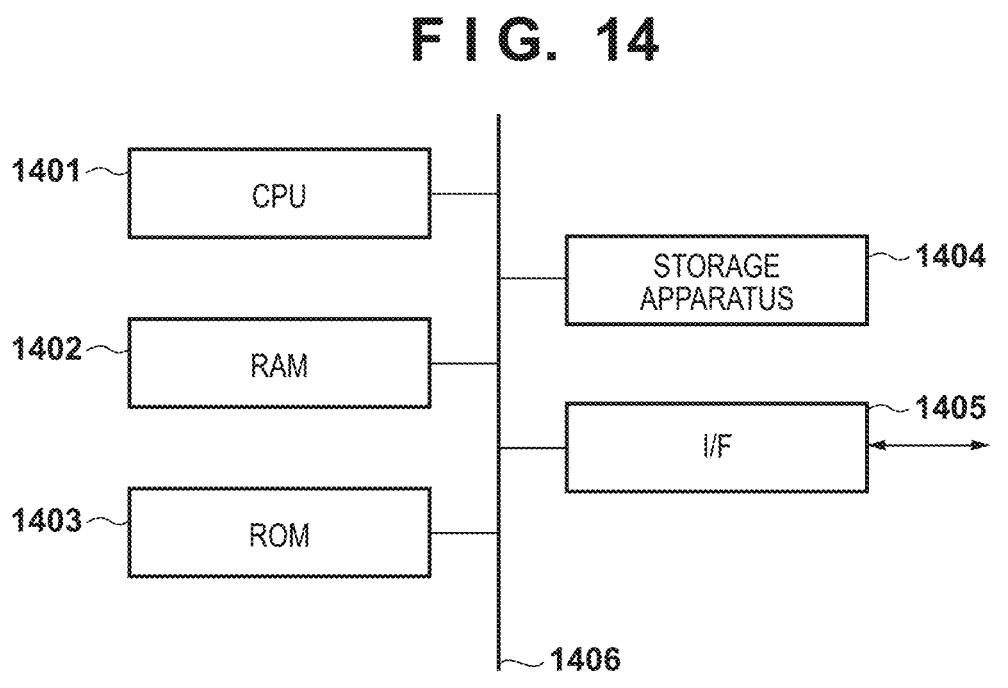

The CPU 1401, the RAM 1402, the ROM 1403, the storage apparatus 1404, the I/F 1405 are all connected to a system bus 1406. Note that the hardware configuration illustrated in FIG. 14 is merely one example of a hardware configuration of a computer apparatus applicable to the field angle adjustment apparatus 1004 and the field angle adjustment apparatus 2004, and may be modified/changed as appropriate.

The numerical values, processing timings, processing orders, processing entities, and data (information) acquiring method/transmission destination/transmission source/storage location, and the like that are used in each of the embodiments described above are referred to by way of an example for specific description, and are not intended to be limited to these examples.

Alternatively, some or all of the embodiments described above may be used in combination as appropriate. Alternatively, some or all of the embodiments described above may be selectively used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-123766, filed Jul. 28, 2023, which is hereby incorporated by reference herein in its entirety.

What is claimed is:

1. An information processing apparatus configured to control an image capturing apparatus including a driving unit for driving in a pan direction or a tilt direction, the information processing apparatus comprising:
   an update unit configured to update a threshold value in a direction opposite to a change direction within a predefined speed range when a driving speed of the driving unit is changed across the threshold value within the predefined speed range; and
   a change unit configured to change the driving speed to a value equal to or greater than an upper limit value of the predefined speed range when a speed of a tracking target of the image capturing apparatus is equal to or greater than the threshold value within the predefined speed range, and change the driving speed to a value equal to or less than a lower limit value of the predefined speed range when the speed of the tracking target is less than the threshold value within the predefined speed range.

2. The information processing apparatus according to claim 1, wherein
   the update unit determines whether the driving speed of the driving unit is changed across the threshold value within the predefined speed range, based on a history of the driving speed of the driving unit.

3. The information processing apparatus according to claim 1, further comprising:
   a unit configured to acquire a tracking setting including a size and a position for capturing the tracking target within a field angle of the image capturing apparatus.

4. The information processing apparatus according to claim 3, further comprising:
   a calculation unit configured to obtain the driving speed of the driving unit according to the tracking setting.

5. The information processing apparatus according to claim 1, wherein
   the update unit sets the threshold value to a value greater than the center of the predefined speed range when the driving speed is increased from a speed outside the predefined speed range to a speed within the predefined speed range.

6. The information processing apparatus according to claim 1, wherein
   the update unit does not update the threshold value when the driving speed is increased from a speed within the predefined speed range to a speed within the predefined speed range without crossing the threshold value.

7. The information processing apparatus according to claim 1, wherein
   the update unit does not update the threshold value when the driving speed is reduced from a speed within the predefined speed range to a speed within the predefined speed range without crossing the threshold value.

8. The information processing apparatus according to claim 1, wherein the update unit re-sets the threshold value to a value less than the center of the predefined speed range when the driving speed is increased from a speed within the predefined speed range to a speed within the predefined speed range while crossing the threshold value.

9. The information processing apparatus according to claim 1, wherein the update unit sets the threshold value to a value less than the center of the predefined speed range when the driving speed is reduced from a speed outside the predefined speed range to a speed within the predefined speed range.

10. The information processing apparatus according to claim 1, wherein the update unit re-sets the threshold value to a value greater than the center of the predefined speed range when the driving speed is reduced from a speed within the predefined speed range to a speed within the predefined speed range while crossing the threshold value.

11. The information processing apparatus according to claim 1, further comprising:

a unit configured to acquire a predefined speed range, based on information acquired from the image capturing apparatus.

12. The information processing apparatus according to claim 1, further comprising:

a unit configured to control a width of the predefined speed range, based on information indicating rapidity for capturing the tracking target within a composition.

13. The information processing apparatus according to claim 1, further comprising:

a unit configured to control a width of the predefined speed range, based on a position set as a position within a field angle for capturing the tracking target.

14. The information processing apparatus according to claim 1, wherein the change unit does not change the driving speed until the number of times when a magnitude relationship between the speed of the tracking target and the threshold value is successively changed within the predefined speed range reaches a predefined number, and permits a change of the driving speed when the number reaches the predefined number.

15. The information processing apparatus according to claim 1, wherein the predefined speed range is a range of the driving speed of the driving unit where vibration and noise are generated due to resonance.

16. An information processing method performed by an information processing apparatus configured to control an image capturing apparatus including a driving unit for driving in a pan direction or a tilt direction, the information processing method comprising:

updating a threshold value in a direction opposite to a change direction within a predefined speed range when a driving speed of the driving unit is changed across the threshold value within the predefined speed range; and changing the driving speed to a value equal to or greater than an upper limit value of the predefined speed range when a speed of a tracking target of the image capturing apparatus is equal to or greater than the threshold value within the predefined speed range and changing the driving speed to a value equal to or less than a lower limit value of the predefined speed range when the speed of the tracking target is less than the threshold value within the predefined speed range.

17. A non-transitory computer-readable storage medium storing therein a computer program for causing a computer to function as:

a update unit configured to update a threshold value in a direction opposite to a change direction within a predefined speed range when a driving speed of a driving unit is changed across the threshold value within the predefined speed range, the driving unit being provided to an image capturing apparatus and driving in a pan direction or a tilt direction; and a change unit configured to change the driving speed to a value equal to or greater than an upper limit value of the predefined speed range when a speed of a tracking target of the image capturing apparatus is equal to or greater than the threshold value within the predefined speed range and change the driving speed to a value equal to or less than a lower limit value of the predefined speed range when the speed of the tracking target is less than the threshold value within the predefined speed range.

* * * * *